April 1, 1924.
M. H. ADAMS
1,489,051
LIQUID LEVEL INDICATOR
Filed Nov. 8, 1922
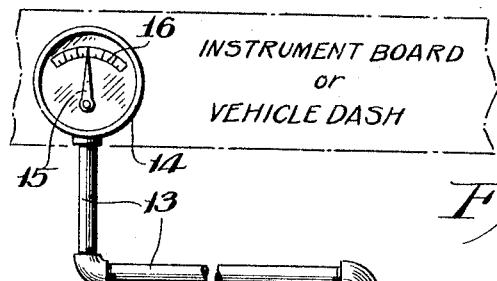
Fig. 1.
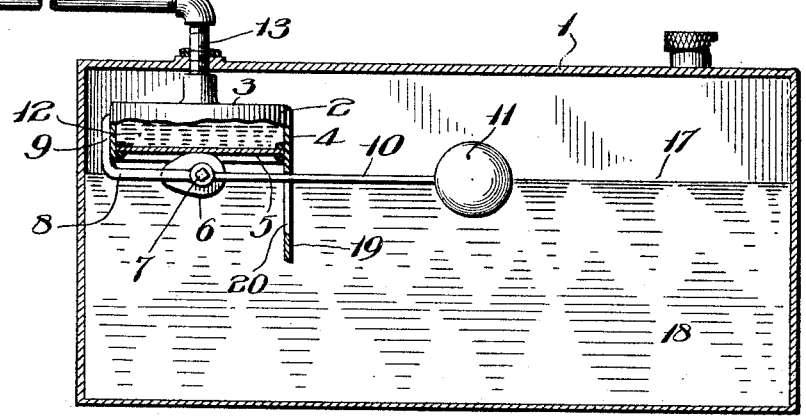
Fig. 2.
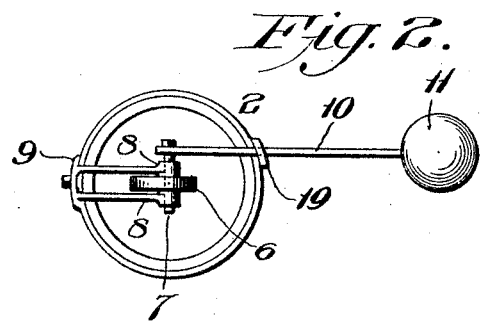
INVENTOR:
Merritt H. Adams.
BY
ATTORNEYS.

Patented Apr. 1, 1924.

1,489,051

UNITED STATES PATENT OFFICE.

MERRITT H. ADAMS, OF PHILADELPHIA, PENNSYLVANIA.

LIQUID-LEVEL INDICATOR.

Application filed November 8, 1922. Serial No. 599,633.

*To all whom it may concern:*

Be it known that I, MERRITT H. ADAMS, a citizen of the United States, residing in the city and county of Philadelphia, State of Pennsylvania, have invented a new and useful Liquid-Level Indicator, of which the following is a specification.

My invention consists of a novel construction of indicator or gage for indicating the height or change of level in gasoline or other tanks, wherein the height of the liquid to be measured or ascertained is controlled by a float having a direct connection to a rotatable cam, which is mounted so as to bear directly against a flexible wall or diaphragm of a vessel preferably contained within said tank and containing mercury, alcohol or a similar liquid, whereby any variations of the pressure within said vessel caused by the movements of said cam against said diaphragm, are communicated through a pipe or tube to a suitable gage of any conventional character, having a pointer, which in the case of an automobile, can be installed upon the instrument or vehicle dash thereof.

To the above ends my invention consists of a novel construction of a vessel containing a suitable liquid and having one side or wall thereof flexible or composed of a flexible diaphragm, which is adapted to be compressed by the direct contact of a cam thereon, said cam being directly connected to a float of any suitable character which rises and falls as the level of the liquid to be indicated varies.

It further consists of a novel manner of mounting and supporting the cam and the stem carrying the float upon the receptacle or vessel containing the compressible liquid, whereby the cam has no lost motion and is permitted directly to contact with the flexible diaphragm, so that a multiplicity of moving parts which are liable to get out of order, such as levers, springs and other unnecessary mechanism is avoided.

It further consists of a novel manner of supporting the cam and the float rod upon a single shaft and in vertically guiding the rod or stem which carries the float, so that no undue tension or side play will be imparted to the cam or cam shaft and their adjuncts.

It further consists of other novel features of construction and advantage, all as will be hereinafter pointed out.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical, sectional view of an indicator for gasoline and other tanks, embodying my invention.

Figure 2 represents a bottom plan view of a portion of Figure 1, showing the manner of mounting the cam, cam shaft, float, float rod and their adjuncts.

Similar numerals of reference indicate corresponding parts.

Referring to the drawings,

In carrying out my invention, I employ a suitable tank as 1, which has supported in the upper portion thereof in any suitable manner, a vessel 2 composed of a top 3 and a side 4, made of sheet metal or the like, the bottom 5 of said vessel being flexible or composed of a flexible diaphragm, whose peripheral edges are secured to the annular or other wall 4 in any suitable manner.

It will be apparent from Figure 2 that while I have shown the vessel 2 as being annular, it is obvious that any other or polygonal shape may be employed, if desired.

6 designates a cam which is mounted on the cam shaft 7 having its bearings in the arms 8 which are in the form of a fork and have the upward extension 9 which is secured in any suitable manner to the wall 4 of the vessel 2.

The outer end of the cam 7 has one end of the rod or stem 10 connected directly thereto, the other end thereof carrying the float 11.

The vessel 2 contains a liquid, as indicated at 12, such as mercury or alcohol, which will not freeze or change under climatic conditions, and from the upper portion or top 3 of the vessel 2 extends a pipe or tube 13 to the gage 14 of any conventional type, which is provided with a pointer 15 and dial 16, the variations of pressure caused by the flexing of the diaphragm 5 being conveyed through the tube 13 to said gage.

The lower portion of the tube 13 may be threaded into the top of the tank 1, and provided with a lock nut, if desired.

In order that the float valve or stem 10 may be effectively vertically guided, as the level 17 of the gasoline or other liquid 18 varies, I provide the pendant guide or arm 19, having the vertical slot 20 therein, whereby it will be apparent that the rod or stem 10 will be accurately guided in a vertical line, as the float rises and falls, so that there will be no binding or improper tension on the cam shaft 7, it being apparent that said pendant arm may be omitted.

The operation is as follows:—

The working face of the cam 6 is so shaped that when the gasoline tank is full, the proper indication will be made on the dial 16.

As the level 17 of the gasoline or other liquid falls, the float falls and it will be apparent that a direct and instantaneous movement or rotation will be simultaneously imparted to the cam shaft 7 and the cam 6 fast thereon, whereby pressure will be exerted by the contiguous cam face upon the diaphragm 5 in an upward direction, this pressure being communicated to the liquid 12, and thence through the tube 13 to the pointer 15 of the gage which will record or indicate the height of level of the gasoline or other liquid 17.

The vessel 2 can be supported in the tank 1 in any suitable manner and the parts 2, 6, 7, 8, 10 and 11 can obviously be handled and installed or removed as a unit, so that upon the installation of the vessel 2 in place, the entire apparatus is assembled and ready to function, as above described.

It will be seen from the foregoing that there is no lost motion in any of the parts and the movement of the float 11 will be instantly communicated to the cam by reason of their direct connections and as there is an entire absence of springs, levers and the like, it will obvious to those skilled in the art that my novel device can be very cheaply manufactured, will be efficient and reliable in its operation and will accurately at all times indicate the level of the gasoline or other liquid.

It will be understood that where my novel device is employed in connection with an automobile, the tank may be located in any convenient point on the automobile and the gage 14 can be placed in any suitable point, as on a dash board or instrument board of the vehicle.

Having thus described my invention, what I claim as new and desire to secure by Letters Patent, is:—

In a device of the character stated, a tank, a suitably supported vessel located wholly within said tank, said vessel containing a liquid unaffected by climatic conditions and having a flexible bottom wall, arms carried by said vessel and extending below the latter, a cam shaft mounted in said arms, a cam mounted on said shaft and bearing directly on said flexible wall, a rod having one end connected to said cam shaft and a float secured to the other end of said rod and a pendant slotted guide carried by said vessel for said rod for ensuring the vertical movement of said rod and float.

MERRITT H. ADAMS.

Witnesses:
L. S. TRUMBAUER,
C. H. LARKIN.